(12) United States Patent
Koulinitch et al.

(10) Patent No.: US 8,443,452 B2
(45) Date of Patent: May 14, 2013

(54) URL FILTERING BASED ON USER BROWSER HISTORY

(75) Inventors: Irina Koulinitch, Bellevue, WA (US); Ram Viswanathan, Kirkland, WA (US); Hans Andersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 12/695,770

(22) Filed: Jan. 28, 2010

(65) Prior Publication Data

US 2011/0185436 A1 Jul. 28, 2011

(51) Int. Cl.
*G06F 21/00* (2006.01)
(52) U.S. Cl.
USPC .............................. 726/27; 726/26
(58) Field of Classification Search ........................ None
See application file for complete search history.

(56) References Cited

U.S. PATENT DOCUMENTS

| | | | |
|---|---|---|---|
| 7,424,476 B2 | 9/2008 | Apparao et al. | |
| 8,239,953 B1 * | 8/2012 | Satish et al. | 726/25 |
| 2001/0039616 A1 * | 11/2001 | Kumagai et al. | 713/169 |
| 2001/0049620 A1 | 12/2001 | Blasko | |
| 2002/0133584 A1 * | 9/2002 | Greuel et al. | 709/224 |
| 2002/0178169 A1 | 11/2002 | Nair et al. | |
| 2007/0073660 A1 * | 3/2007 | Quinlan | 707/3 |
| 2008/0021890 A1 * | 1/2008 | Adelman et al. | 707/3 |
| 2008/0133501 A1 | 6/2008 | Andersen et al. | |
| 2008/0215429 A1 | 9/2008 | Ramer et al. | |
| 2009/0006532 A1 * | 1/2009 | Sinn et al. | 709/203 |
| 2009/0055149 A1 * | 2/2009 | Hayter et al. | 703/11 |
| 2009/0222735 A1 | 9/2009 | Clark et al. | |
| 2009/0282476 A1 * | 11/2009 | Nachenberg et al. | 726/22 |
| 2010/0058468 A1 | 3/2010 | Green et al. | |

FOREIGN PATENT DOCUMENTS

KR 1020060028921 A 4/2006

OTHER PUBLICATIONS

"Security Content Management System", Retrieved at http://www.nsfocus.com/en/1_solution/1_2_6.html Dec. 31, 2009, pp. 7.

(Continued)

*Primary Examiner* — William Goodchild
(74) *Attorney, Agent, or Firm* — Michael B Dodd; Dodd Law Group

(57) ABSTRACT

A URL monitoring system may use a user's browsing history to generate a score for the user. The score may be used to permit or deny access to a URL. The score may be used to represent the user's intent when browsing, and based on that intent, the user may be allowed access to a URL with conflicting classifications. The score may be also be used as a trustworthiness score so that a user who browses responsibly may have their score increased over time, and a user who browses irresponsibly or inappropriately may have their score decreased. The scores may be calculated and maintained on a user's client device, edge device, or other device within a network.

20 Claims, 4 Drawing Sheets

OTHER PUBLICATIONS

Do, et al., "Web Mining for Cyber Monitoring and Filtering", Retrieved at <<http://ieeexplore.ieee.org/stamp/stamp.jsp?arnumber=01460448>> in the proceedings of the 2004 IEEE Conference on Cybernetics and Intelligent Systems, Dec. 1-3, vol. 1, 2004, pp. 399-404.

Shen, et al., "Privacy Protection in Personalized Search" Retrieved at <<http://sifaka.cs.uiuc.edu/xshen/research_files/sigir_forum_ppps.pdf>> Jun. 2007, vol. 41, No. 1, pp. 1-12.

Nejad, et al., "Adaptive Weblog Post Filtering Based on User Browsing History", Retrieved at <<http://www.aaai.org/ocs/index.php/ICWSM/09/paper/download/163/487>> In the proceedings of the Third International ICWSM Conference, 2009, pp. 274-277.

"International search report", Mailed Date: Sep. 9, 2011, Application No. PCT/US2010/062662, Filed Date: Dec. 31, 2010, pp. 9.

Levine, J. "DNS Based Blacklists and Whitelists for E-Mail", Retrieved at <<http://tools.ietf.org/html/draft-irtf-asrg-dnsbl-00>> Apr. 26, 2004, pp. 1-7.

* cited by examiner

URL FILTERING BASED ON USER BROWSER HISTORY

BACKGROUND

Websites and other network resources may have various threats associated with them. For example, some websites may have malware, adware, viruses, or other noxious components that may infect a computer system. Other network resources may have pornography, advertisements, or other information that may not be suitable for a particular network, such as a home network or a business network.

The content classification of the websites may be known as the site's reputation. The reputation may include classifications that may be used to block access in some situations, such as pornography or gambling sites. Other reputations may have good reputations that may be used to allow access to the sites.

In some cases, a website may have multiple classifications. For example, a website may be classified as "travel", "health", and "shopping". In such a case, a policy may permit access to sites classified as "travel" but deny access to "shopping" sites, making the website a questionable site, since some content may be permitted while other content may not be.

SUMMARY

A URL monitoring system may use a user's browsing history to generate a score for the user. The score may be used to permit or deny access to a URL. The score may be used to represent the user's intent when browsing, and based on that intent, the user may be allowed access to a URL with conflicting classifications. The score may be also be used as a trustworthiness score so that a user who browses responsibly may have their score increased over time, and a user who browses irresponsibly or inappropriately may have their score decreased. The scores may be calculated and maintained on a user's client device, edge device, or other device within a network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
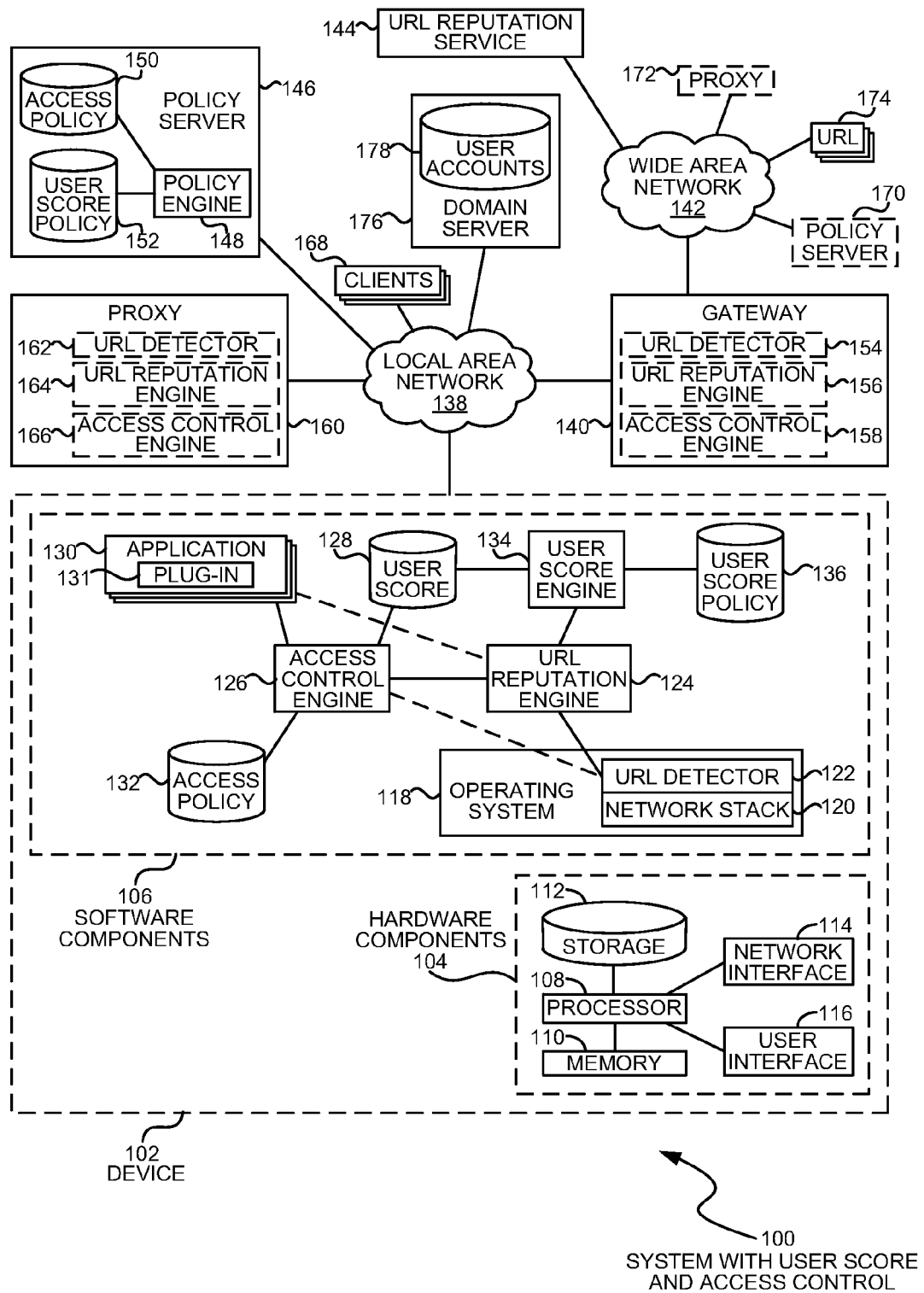
FIG. 1 is a diagram illustration of an embodiment showing a network environment in which a URL monitoring system may operate.

A URL monitoring system may permit or deny access to a website or other URL based on a user's history. The user's history may be collected in the form of scores based on the classification of URLs visited by the user over time. Each visited URL may have one or more classifications, and the user's history may be summarized by adding or subtracting values based on each of the classifications of the URL.

The scores may be calculated on a short term basis to identify a user's current intent. For example, a user's browsing history over several minutes may be used to infer the user's intent and may be used to allow access to a website that has the same classification as the current intent of the user.

The scores may also be calculated on a long term basis to reflect a user's compliance with Internet browsing policy and the scores may reflect a user's general trustworthiness in the view of an enterprise that defines the policy. Users with higher trustworthiness may be permitted to browse to websites with questionable classification while users with low trustworthiness scores may not be permitted.

The URL monitoring system may have a set of policies that may define how the user's scores may be calculated as well as criteria for permitting or denying access to URLs. The URL monitoring system may operate on a client device, on an edge device, or at least partially in a cloud based system. Some embodiments may include some components of the URL monitoring system on different devices. In many cases, the URL monitoring system may not track the specific sites a user may visit, but only the classification scores or summary statistics of the classification scores to eliminate privacy concerns.

Throughout this specification and claims, the term "URL" may refer to a Uniform Resource Locator. Synonymous terms include Uniform Resource Identifier (URI), Uniform Resource Name (URN), 'website', 'site', 'network address', and other terms. The term 'URL' is used to denote an address for a request for which a classification may be provided by a reputation service. Typically, the URL may be a website, web service, application, or other information that may be requested from a remote device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for permitting or denying access to a URL. Embodiment 100 is a simplified example of a system that may update a user's score to infer trustworthiness and intent when browsing to different URLs.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 represents one example of a network environment in which a user's browsing history may be used to determine whether the user would be able to access a URL or not. The user's history may indicate whether the user is trustworthy and compliant with a general browsing policy, as well as indicate the intent of a user for a single session.

In many cases, a URL may have a classification that includes several classes, some of which may be permitted by an access policy and some of the classes may be denied by the access policy. When a user encounters such a URL, those users with a favorable browsing history may be permitted access to a URL that may contain both favorable and unfavorable classes. Another user without the favorable browsing history may not be permitted access to the same URL.

The user's browsing history may be represented as a user score. The score may be updated with each URL visited, and may be used to reflect the intent of a user in the short term or as an overall trustworthiness of the user in the long term.

As a short term indicator, a user who visits several 'good' URLs may be assumed to be searching or browsing for 'good' classes of URLs, and when a subsequent URL is visited that contains both 'good' and 'bad' classes, the user may be given the benefit of the doubt and allowed access to the URL.

For example, assume that a company's access policy allows a user to view sites classified as 'travel' but not sites classified as 'shopping'. The company's policy may be an attempt to limit shopping and online purchases made by employees during work hours. When a user attempts to visit a site that is classified as both 'travel' and 'shopping', the access policy may permit 'travel' but deny 'shopping' and the user's immediate browsing history may be a factor in permitting or denying access to the site.

Continuing with the example, a user who has visited 'travel' sites in the few minutes prior to attempting to view the site classified as both 'travel' and 'shopping' may be allowed to visit the site because the user's intent can be inferred to be an interest in 'travel' rather than 'shopping'. Another user who has failed in attempts to view 'shopping' sites prior to visiting the same site classified as both 'travel' and 'shopping' may not be allowed to visit the site because the user's actions inferred an intent to visit 'shopping' sites.

Some embodiments may use a user's short term browsing history to infer an intent by the user to use Internet resources in a responsible and compliant manner. In such embodiment, the user's browsing history for a single session or for a short period of time may be summarized in a user score. The user score may be used to permit or deny access to those URLs that have questionable or conflicting classifications according to an access policy.

As a long term indicator, an employee's browsing history may be summarized into a user score that may persist over many browsing sessions and over many days or even months or years of time. The long term indicator may infer a user's compliance with a company's access policy and may build over time as the employee uses Internet resources in a responsible manner. An employee who has increased their user score to a high enough level may be allowed to view URLs with questionable or conflicting classifications, where a new employee or one who has not shown to be as responsible may not be granted access.

In one use scenario, the user score may be used as a training aid or probationary monitor for a new employee. The new employee may be given a default user score which may be low enough that the user would only be allowed to sites that have no undesirable classifications, even if the site had additional 'good' classifications. Over time, the new employee may browse to only 'good' sites and may have their score increase, reflecting their responsible behavior. As their score increases, the user may be permitted wider access to the Internet, including sites that may be classified as 'bad' in some occasions.

Some employees may have a habit of clicking on advertisements in websites or emails or responding to phishing emails. Such habits may cause an employee's user score to be very low over time. Such employees may become trained by the user score system to avoid such bad habits and to browse to sites that align with the company access policy. As the employees avoid browsing to problem websites, their user score may increase, allowing them access to more of the Internet.

The user score may have several different embodiments. In one embodiment, the user score may be a single value that may be modified with each URL visited. In such an embodiment, a score may be calculated for a rested URL and the score added to the previous user score to create a current user score.

Since each URL reputation may include multiple classifications, a user score policy may define a formula or weighting scale for each of the classifications for the URL. The formula or weighting scale may be used to calculate a summary score for the URL.

For example, a user score policy may apply a positive value for 'good' classifications and a negative value for 'bad' classifications. The values for a particular URL may be summed and divided by the number of classes to calculate an 'average' score for the URL, which may be a positive or negative value. Such an embodiment may allow some 'good' classes may be rated higher than others, and some 'bad' classes to be rated more severe than others.

One such embodiment may calculate a single score from a URL classification and use a simple moving average, cumulative moving average, weighted moving average, exponentially weighted moving average, or other technique for updating the score. A moving average be performed over a relatively short period of time may be a useful predictor for short term indicators, while moving averages over a long period of time may be useful predictors for long term indicators.

In another embodiment, a user score may be separately kept for each of the many classes that may be provided by a URL reputation service. For example, a numerical value may be updated for each class returned by a URL reputation service. A user may have a current value for each class, such as 'travel', 'shopping', 'pornography', 'phishing', 'hobbies', 'social networking', 'religious', 'politics', or any of a host of classifications. Each time a URL is requested that includes multiple classifications, each value may be updated for the individual classes, then a summary statistic or user score may be calculated from all of the values stored for the various classifications.

Examples of different methods for updating user scores may be found in embodiments 300 and 400 presented later in this specification.

There may be some classes that may not be permitted access regardless of a user score. For example, a known phishing site, a site with known malware, pornography, or other classifications may be prohibited regardless of a user score. Other sites with less desirable but not prohibited classes, such as 'shopping' in the examples above, may be permitted to those users with high user scores.

Embodiment 100 illustrates an environment in which a URL reputation service may operate. A device 102 is illustrated as having hardware components 104 and software components 106. The device 102 as illustrated may be a general purpose device on which a user may access resources on the Internet by accessing various URLs.

The device 102 may be a general purpose computer, such as a desktop computer, laptop computer, server computer, or other device. In some cases, the device 102 may be a portable device such as a cellular telephone, handheld scanner, netbook computer, or other device. The device 102 may also be a network appliance, game console, or other device.

The hardware components 104 may include a processor 108, random access memory 110, and nonvolatile storage 112. The hardware components 104 may also include a network interface 114 and a user interface 116.

The software components 106 may include an operating system 118 on which one or more applications 130 may execute. A user may operate the applications 130 to access various URLs. A typical type of such applications may be a web browser, for example.

The device 102 may permit or deny access to various URLs based on the user's score and the reputation classification of the URL. Device 102 illustrates an example where the detection of the URL request and the processing of the URL classification may be performed by the device 102. In some embodiments, some portions of the detection and processing of the URL classification may be performed by other devices.

The operating system 118 may have a network stack 120 that may represent the components used to communicate over a network connection. A URL detector 122 may be added to the network stack 120. The URL detector 122 may detect that a URL request has been generated by a user and may direct the URL to a URL reputation engine 124. The URL reputation engine 124 may transmit the URL to a URL reputation service 144 and receive a set of classifications for the URL.

The URL detector 122 may monitor network traffic to identify URL requests made through the network stream. In many cases, the URL detector 122 may be able to determine which user of the device 102 initiated a request so that a specific user's score may be updated. The URL detector 122 may also be able to determine which of the various applications 130 generated the URL request.

Embodiments that use a URL detector 122 may be able to capture URL requests from multiple applications 130 for a single user and update the user score based on all of the user's activities, not just activity on one application. Embodiments that use a URL detector 122 may have an installation mechanism that installs the URL detector 122 within an operating system environment.

Other embodiments may detect URL requests using different mechanisms. For example, an application 130 may have a plugin 131 that may be added to the application 130 and may identify URL requests. The plugin 131 may interact with the URL reputation engine 124 and access control engine 126 to gather URL reputation information and determine whether or not to permit access to a requested URL.

Embodiments that use the URL detector 122 may be able to manage all URL access from a single device without allowing any mechanism by which a user may get around the various URL monitoring components. In some devices, many different applications 130 may send URL requests and display information from remote websites. While many such accesses may be using a web browser, other applications such as word processing programs, spreadsheets, email clients, and other applications may have capabilities to search for URLs and display the contents of a URL. Sometimes, these applications have web browsing capabilities as well.

Embodiments that use plugins 131 to detect URL requests may be useful in embodiments where short term tracking of a user's actions may be used to infer a user intent, as the plugins 131 may gather information from a single browsing session for a single application. For example, a plugin 131 may be able to infer user intent from the actions of a single tab within a tabbed browser. A URL detector 122 may aggregate multiple browsing sessions and URL requests from multiple applications, and may or may not be capable of distinguishing between applications or tabbed sessions of a single browser, for example.

The URL reputation engine 124 may receive a URL and communicate with a URL reputation service 144 to determine a URL's classification. Each URL reputation service may determine URL classifications in different manners. In general, a URL reputation service 144 may receive a URL and return a set of classifications. Based on the set of classifications, an access control engine 126 may use an access policy 132 to evaluate the classifications. The URL reputation service 144 may not permit or deny access, but merely provide the information about the URL so that a local determination may be made as to how to handle the URL.

The access policy 132 may be different for each implementation and each user. In each case, the access policy 132 may assign some value to a classification to determine a 'goodness' or 'badness' value to the classification. For example, some embodiments may consider a classification of 'religious' as 'bad' while in other embodiments, a classification of 'religious' may be considered as 'good'. In still other embodiments, a classification of 'religious' may be considered as 'neutral'.

The access policy 132 may allow different environments to treat different types of URLs as an administrator may see fit. In a home environment where children may use the device 102, a parent may wish to prohibit some classes of URLs that may be permitted or even encouraged in other environments.

The classifications provided by a URL reputation service 144 may be any type of classification imaginable. Many URL reputation services may provide classes that indicate potential security problems, such as phishing sites, sites that may contain malware, and the like. Some URL reputation services may include classes that indicate potential worker productivity problems, such as social networking, dating, or shopping, where an employee's productivity may be diminished when accessing such sites. Still other URL reputation services may include classes that relate to the topical content of a URL, such as engineering, computer science, medicine, business management, or other classes. Some URL reputation services may provide merely a few classes, while other URL reputation services may classify URLs into a taxonomy of many hundreds or thousands of classes, sometimes arranged into a hierarchy of classes.

The access control engine 126 may permit or deny access to a URL based on the URL classification after applying the access policy 132. Different embodiments may permit or deny access using various mechanisms. In one mechanism, the access control engine 126 may determine that a URL request is denied prior to sending a communication to the URL itself. In such an embodiment, the access control engine 126 may create a response message to the URL request indicating that access was denied and transmit the response over the communication channel on which the URL request was transmitted. If the access control engine allows access to the URL, the outgoing URL request may be transmitted to the URL 174 and the response may be received by the requesting application.

In another embodiment, the URL reputation engine 124 may receive the URL while the URL request is being transmitted to the URL 174. Before the URL may be accessed by the user, the URL reputation engine 124 may gather classification data, pass the reputation information to the access control engine 126, and the information received from the URL 174 may be cached until the access control engine 126 permits access. The difference between the two previous embodiments is whether or not a decision to permit access to the URL is made before sending the URL request to the URL 174. The tradeoff between the embodiments may be the first embodiment may conserve bandwidth at the expense of response time, while the second embodiment may improve response time at the expense of bandwidth.

The URL reputation engine 124 may provide URL classification information to a user score engine 134. The user score engine 134 may use a user score policy 136 to update a user score 128. The user score 128 may be used to determine whether or not to permit access to a URL.

The user score 128 may be a factor used by the access control engine 126 to permit or deny access to a URL. Users with higher scores may be permitted access, while users with lower scores may be denied access to the same URL. Users with higher scores may be inferred to be compliant with the access policy 132 and therefore may be more trusted than other users.

The user score policy 136 may include a formula, algorithm, or various parameters that may be used to calculate and update a user score 128. The formula may include an adder, weighting factor, significance factor, or other mechanism to indicate the general 'goodness' or 'badness' of a classification, and the formula may raise the user score 128 when the user visits 'good' sites and lower the user score 128 when the user visits 'bad' sites.

In many embodiments, the user score policy 136 may be similar to the access control policy 132 in that the classes for which access is permitted may also raise a user score. However, some embodiments may apply different factors to user score calculation as for access control policies. For example, an access control policy may be defined with the relative importance or ranking for classes that are denied and other classes that are undefined may be permitted access. The corresponding user score policy may have factors for both the classes that are considered 'bad' as well as those considered 'good'.

The user score 128 may reflect a user's browsing history but may not contain the precise sites visited by the user. Each site may be represented only as a score, rather than the exact site so that the user's privacy is respected. Another person, such as an administrator, could not determine a user's browsing history from the user score 128, but may only be able to tell how well the user has complied with the browsing rules as defined in the user score policy 136.

The device 102 may be connected to a local area network 138, which may connect to a gateway 140 to a wide area network 142.

The device 102 may represent an embodiment where a single device may perform the functions of detecting a URL, determining the URL classification from a URL reputation service, updating a user score, and permitting or denying access to the URL based on the classification and user score.

In some embodiments, certain components of the URL monitoring system may be contained in the gateway 140 or a proxy 160. These other configurations may perform some functions in a centralized manner within the local area network 138 and may be capable of functioning without having to install various components in client devices, such as device 102. Such embodiments may perform URL monitoring service for many clients 168 in a centralized manner, and may also have caching or other functions that may improve speed and reduce bandwidth, as well as provide various security monitoring functions such as malware scanning.

The gateway 140 may be a device that connects the local area network 138 with the wide area network 142, which may be the Internet or other wide area network. The gateway device 140 may be an 'edge' device.

The proxy 160 may be a device through which all network traffic to the wide area network 142 may flow. A proxy may be used to obfuscate internal network addresses for security reasons, to speed up network access using caching, to scan incoming and outgoing communications for malware, or for other purposes. In some embodiments, the gateway 140 may perform many or all of the same functions as described for the proxy.

A URL detector 154 may be installed in the gateway 140. The URL detector 154 may operate in a similar fashion as the URL detector 122 of the device 102, where the URL detector 154 may be part of the network stack and identify URL requests on a network communication stream. Once the URL detector 154 has identified a URL request, a URL reputation engine 156 may transmit the URL to a URL reputation service 144 and receive the URL classification. An access control engine 158 may permit or deny access to the URL based on a user score.

Similar to the gateway 140, the proxy 160 may have a URL detector 162, a URL reputation engine 164, and an access control engine 166 to perform similar functions. Many embodiments may have the various URL monitoring functions deployed in either a proxy 160 or gateway 140, but generally not both. For the purposes of this specification and claims, URL monitoring operations attributed to the gateway 140 may also be applied to the proxy 160.

In an embodiment where an access control engine 158 or 166 is located remotely from the device 102, the access control engine may use the user score to determine whether or permit or deny access to the URL. In some embodiments, the device 102 may contain the user score 128 and the access control engine 158 or 166 may request the user score 128 from the device 102. In other embodiments, a domain server 176 may contain user accounts 178, where the user accounts 178 may contain the user score.

In embodiments where the user score is located away from the user's device 102, the user score may be located in a secure database, such as a user account database on a domain server 176. In many embodiments, the user score may be considered personal information, even though the user score may not contain any reference to specific sites visited by the user, but only a summary statistic.

A policy server 146 may be connected to the local area network 138 and may create, modify, and distribute the access policies and user score policies throughout the local area network. The policy server 146 may have a policy engine 148 that may create the access policy 150 and user score policy 152, and then may distribute the policies to the various clients 168, including device 102.

The access policy 150 and user score policy 152 may be configured as general policies that apply to all users of the local area network 138. In some embodiments, two or more different sets of policies may be used. For example, one set of policies may be applied to users who authenticate against the domain server 176 and a second set of policies may be applied to guests or unauthenticated users. In another example, several sets of policies may be applied to user groups, with one set of policies applied to devices that are accessible on a manufacturing floor, another set of policies applied to devices within a call center, and a third set of policies applied to devices within engineering and management departments.

In some embodiments, some portions of the URL monitoring services may be provided outside of the local area network 138. For example, a policy server 170 or proxy 172 may be accessed through the wide area network 142.

Figure 2:
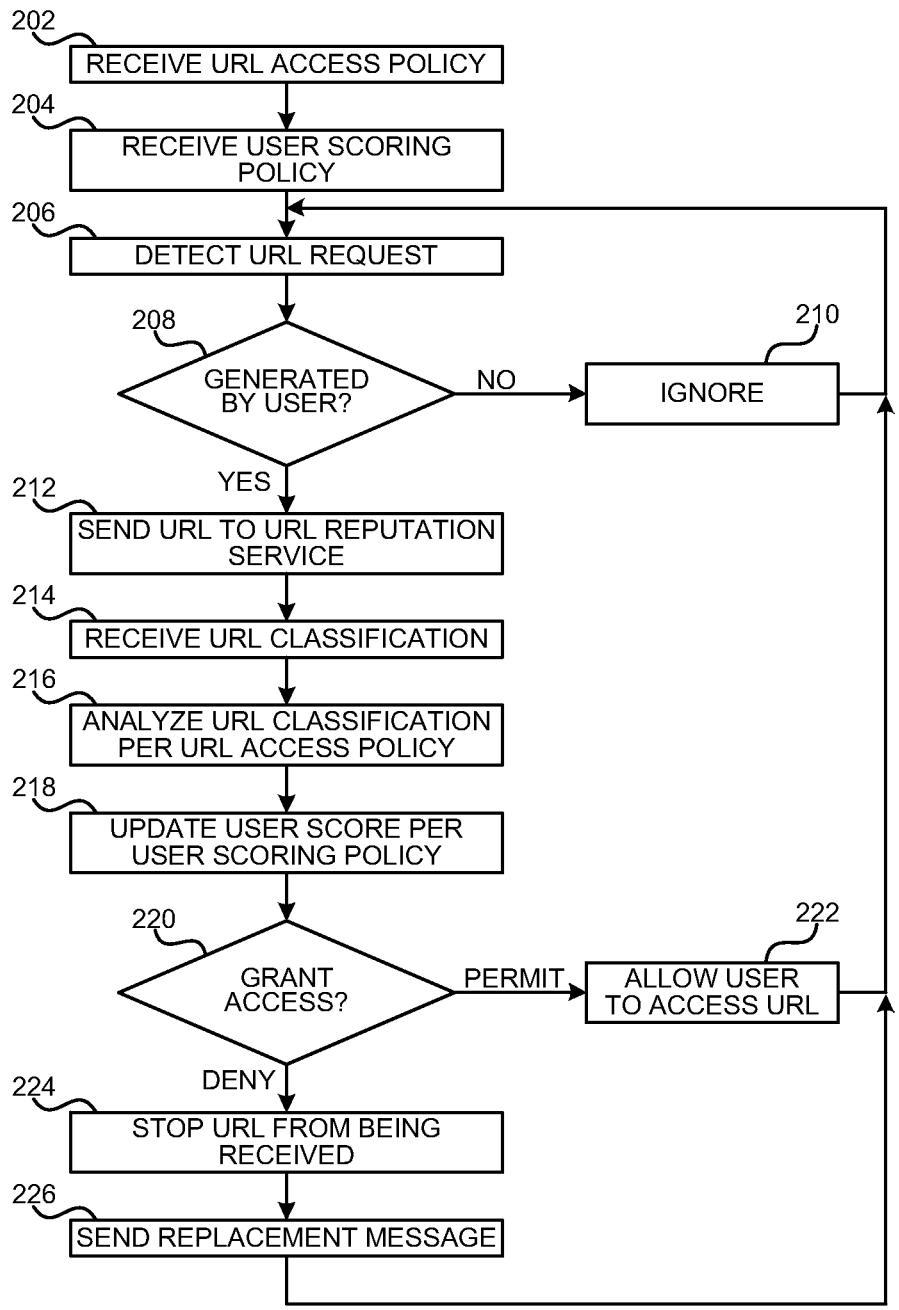
FIG. 2 is a flowchart illustration of an embodiment showing a method for monitoring and controlling URL access.

FIG. 2 is a flowchart illustration of an embodiment 200 showing a method for monitoring and controlling URL access. Embodiment 200 is a simplified example of the steps that may be performed by the various URL monitoring components, such as those described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a process that may be used to permit or deny access to URLs based on the URL's classification and a user score. The user score may be updated and may be used to indicate a long term compliance with a predefined access policy as well as to indicate a short term user intent during a particular browsing session.

In block 202, a URL access policy may be received. In block 204, a user scoring policy may be received. The access policies may be received from another device, such as a policy server, for example.

The access policy may define parameters that may be used to permit or deny access to URLs based on the URL classifications. The access policy may be used by algorithms, formulas, or other mechanisms that are used to determine access to a URL. In many cases, the access policy may define a method for scoring the URL and a method for comparing the URL score to a user score to determine access to the URL.

One embodiment for scoring a URL may apply various weighting factors for each of the URL's classifications. The weighting factors may be averaged to determine a URL score. In order to compare the URL score to a user score, a multiplier may be used. Such an embodiment is merely one example of a mechanism.

A URL request may be detected in block 206.

In block 208, an analysis may be performed to determine if the URL was generated by a user or not. If not, the URL may be ignored in block 210.

In many websites, a call to one URL may result in calls to many more URLs. For example, calling a single website page in one URL may result in queries to various advertisement servers or other websites to populate the webpage with content from many different servers.

The analysis in block 208 may determine if the URL call is the result of a user selecting a specific website to visit, for example, as opposed to websites that are called or linked-to by the first website. Such an analysis may apply URL monitoring to only the original URL called by the user, and may not analyze all of the URLs to which the original URL may link or may call. This may be useful in cases where a URL may make calls to advertisements that may change with each time the first URL is loaded, for example, and may adversely affect the user score and whether the URL may be viewed or not.

The URL may be transmitted to the URL reputation service in block 212 and the URL classification may be received in block 214.

The URL classification may be analyzed per the URL access policy in block 216. In many cases, the URL access policy may create a score or rating for the URL based on the parameters defined in the access policy.

Also using the URL classification, the block 218 may update the user score per the user scoring policy. Two examples of updating the user score are illustrated in embodiments 300 and 400 presented later in this specification.

Based on the user score and the URL score, a determination may be made in block 220 to permit or deny access to the URL. If the URL is permitted in block 220, the user may be allowed access in block 222. If the URL is not permitted in block 220, the URL may be stopped from being received in block 224 and a replacement message may be transmitted to the user's application in block 226.

Figure 3:
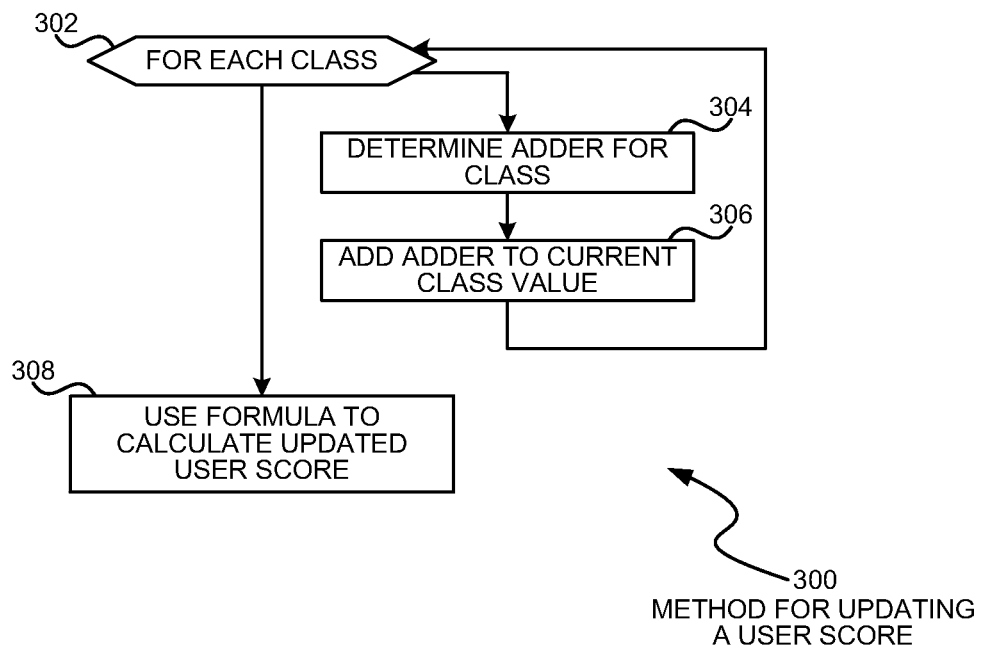
FIG. 3 is a flowchart illustration of an embodiment showing a method for updating a user score.

FIG. 3 is a flowchart illustration of an embodiment 300 showing a method for updating a user score. Embodiment 300 is a simplified example of steps that may be performed to calculate or update a user score where a separate score is maintained for each URL classification.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method for updating a user score based on a set of URL classifications received from a URL reputation service. The embodiment illustrates a user score where scores are maintained for separate classes of URLs. In such an embodiment, each user score may include a separate value relating to each of the various classes of URLs based on the user's browsing history. A single user score may be calculated from the user classification scores.

Each class of the URL reputation may be analyzed in block 302. For each class in block 302, an adder for the class may be determined in block 304 and the adder may be added to the current class value in block 308. Based on the updated user class value, a formula may be used to calculate an overall user score in block 308.

The adders from block 304 may be defined in a user scoring policy. In some embodiments, some classes that have 'good' classifications may have a positive number as an adder and some classes that have 'bad' classifications may have a negative adder. The net effect is that visiting 'good' sites will result in the user score increasing while visiting 'bad' sites will result in the user score decreasing.

In some embodiments where two or more classifications are encountered for a single URL, the adders may be divided by the total number of classifications.

The adders may allow some classifications to have a higher weighting on the user score than other classifications. For example, a 'shopping' site may be given a weighting of −1, while a pornography site may be given a weighting of −100. In such an example, the shopping site is not a preferred site, but a pornography site may be considered orders of magnitude worse. In such an embodiment, the user score may be a simple sum of all of the current class values.

In some embodiments, the adders used in block 304 may merely increment the current class value and may not have positive or negative values. In such an embodiment, the formula in block 308 may apply positive or negative weighting values to calculate the updated user score.

Figure 4:
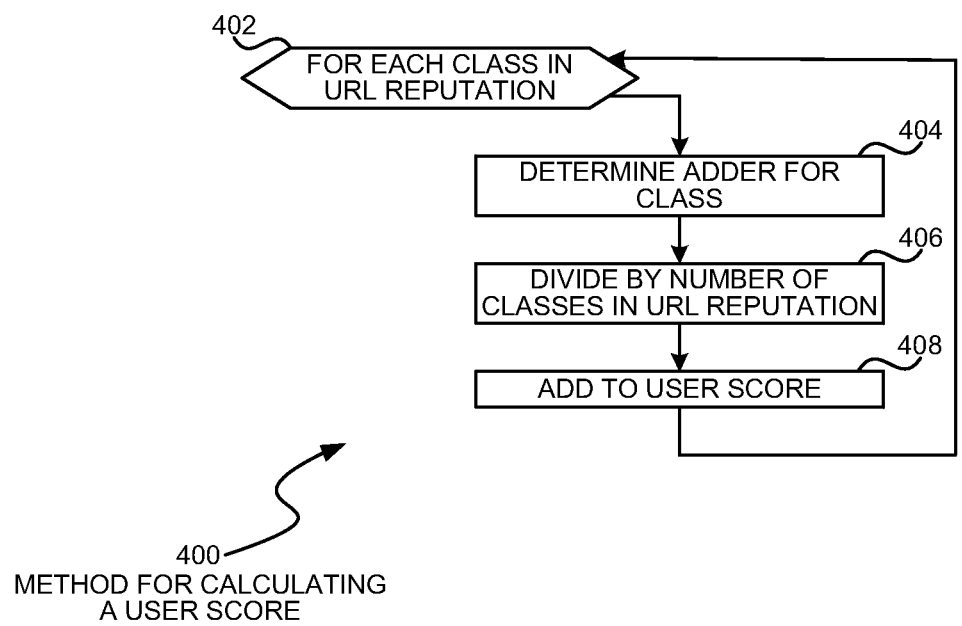
FIG. 4 is a flowchart illustration of an embodiment showing a second method for updating a user score.

FIG. 4 is a flowchart illustration of an embodiment 400 showing a second method for calculating a user score. Embodiment 400 is a simplified example of steps that may be performed to calculate or update a user score where a single value is maintained for the user score.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a second method for updating a user score based on a set of URL classifications received from a URL reputation service. The embodiment illustrates a user score where a single value is maintained for the user score, in contrast to embodiment 300 where values are maintained for every classification. Embodiment 400 may be useful, for example, in cases where the taxonomy of URL classifications is very large.

Each class of a URL reputation may be analyzed in block 402. For each class, an adder for the class may be determined in block 404. The adder may be divided by the number of classes in the URL reputation in block 406, and the result may be added to the user score in block 408.

Embodiment 400 determines an adder for each class and divides by the total number of classes so that the user score is adjusted based on the average adder.

The adders of block 404 may have both positive and negative values. Positive values may raise the user score, while negative values may lower the user score. In many embodiments, the adders may be different from different classifications, reflecting the relative importance of the classification on the overall user score.

In some embodiments, the updated user score may be calculated using a moving average calculation, such as a simple moving average, an exponentially weighted moving average, or other moving average calculation.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, a method being performed on a computer processor for controlling access to content associated with a URL, said method comprising:
   receiving a user scoring policy;
   receiving a URL access policy;
   receiving a URL request comprising a first URL from a user;
   transmitting said first URL to a URL reputation service;
   receiving a URL score for said first URL from said URL reputation service, said URL score indicating that content associated with the URL has a plurality of classifications and also has conflicting classifications, one or more classifications for said associated content viewed favorably in the URL access policy, one or more other classifications for said associated content viewed unfavorably in the URL access policy;
   accessing a user score for said user, said user score summarizing said user's prior browsing behavior based on said user's browsing history; and
   controlling access to said first URL based on said user's prior browsing behavior by comparing said user score to said URL score.

2. The method of claim 1, said user score being calculated by:
   for at least some of said plurality of classifications, updating a user classification score for said first user by applying said user scoring policy; and
   updating said user score based on a plurality of said user classification scores.

3. The method of claim 2, further comprising:
   said user scoring policy comprising a classification factors for each of said plurality of classifications;

said classification factor being summed with said user classification score to determine an updated user classification score.

4. The method of claim 3, said user score being determined based on analyzing URL requests over a predetermined period of time.

5. The method of claim 4, said predetermined period of time being less than two hours.

6. The method of claim 3, said user score being updated over a continuing basis.

7. The method of claim 1, said user score being calculated by:
updating said user score by applying said user scoring policy to each of said plurality of classifications, where said user scoring policy comprises a factor by which each of said plurality of classifications may change said user score.

8. The method of claim 7, said user score being adjusted using an exponentially weighted moving average calculation.

9. The method of claim 1, said URL access policy comprising a scoring algorithm for said first URL.

10. The method of claim 1, wherein controlling access to said first URL based on the user's prior browsing behavior comprises:
inferring said user's browsing intent with respect to said first URL from said user score, said inferred browsing intent indicating an interest in one of: a classification viewed favorably in said URL access policy or another classification viewed unfavorably in said URL access policy; and
controlling access to said first URL by one of:
permitting access to said first URL when said inferred browsing intent indicates an interest in said classification viewed favorably in said URL access policy or denying access to said first URL when said inferred browsing intent indicates an interest in said other classification viewed unfavorably in said URL access policy.

11. The method of claim 1, wherein controlling access to said first URL based on said user's prior browsing behavior comprises:
inferring said user's compliance with said URL access policy from said user score; and
controlling access to said first URL by permitting or denying access to said first URL based on the user's inferred compliance with said URL access policy.

12. A system comprising:
a processor;
system memory;
one or more computer storage devices having stored thereon a URL access policy and a user scoring policy;
a URL detecting mechanism that identifies a URL request over a communication stream;
a URL reputation engine that:
transmits at least a portion of said URL request to a URL reputation service; and
receives a classification for said URL request, said classification comprising a plurality of classes and also comprising conflicted classes, at least one class in the plurality of classes viewed favorably in the URL access policy, at least one other class view in the plurality of classes viewed unfavorably in the URL access policy, the at least one class and the at least one other class conflicting with one another;
an access control engine that:
accesses a user score for a user, said user score summarizing said user's browsing behavior based on said user's browsing history; and
controls access to a URL based on said user's browsing behavior by comparing said classification and said user score, said controlling access based on a first algorithm being at least partially defined in said URL access policy; and
a user score engine that updates said user score based on said classification, said updating based on a second algorithm being at least partially defined in said user scoring policy.

13. The system of claim 12, said URL detecting mechanism being a service monitoring a network connection.

14. The system of claim 13 being located on a client device.

15. The system of claim 13 being located on a server device within a local area network, said URL request being generated by a client device within said local area network.

16. The system of claim 15, said user score engine being operable on said client device.

17. The system of claim 12, said URL detecting mechanism being a plugin for a web browser.

18. At a computer system, a method being performed on a computer processor for controlling access to content associated with a URL, said method comprising:
receiving a user scoring policy;
receiving a URL access policy;
detecting a first URL request over a network connection, said first URL request comprising a first URL;
determining that said first URL request was generated by an action of a first user;
transmitting said first URL to a URL reputation service;
receiving URL score for said first URL from said URL reputation service, said URL score indicating that content associated with the URL has at least one questionable classification in conflict with at least one other classification, said at least one questionable classification viewed unfavorably in the URL access policy, said at least one other classification viewed favorably in the URL access policy;
accessing a user score for said user, said user score summarizing said user's browsing behavior based on said user's browsing history; and
controlling access to said first URL based on said user's browsing behavior by comparing said user score to said URL score according to said URL access policy.

19. The method of claim 18, further comprising:
detecting a second URL request over a network connection, said second URL request comprising said first URL;
determining that said second URL request was generated by an action of a second user;
denying access to said first URL for said second user based on comparing said second user score to said URL score according to said URL access policy.

20. The method of claim 19, further comprising: updating a second user score for said second user based on each of said plurality of classifications and a second current user score, said updating being at least partially defined in said user scoring policy.

* * * * *